Feb. 10, 1948.　　　P. W. VALLEÉ　　　2,435,702
PRESSURE WELDING MACHINE
Filed March 30, 1944　　　5 Sheets-Sheet 3

Inventor
Phillip W. Vallee
by Charles W. Kelly
Attys.

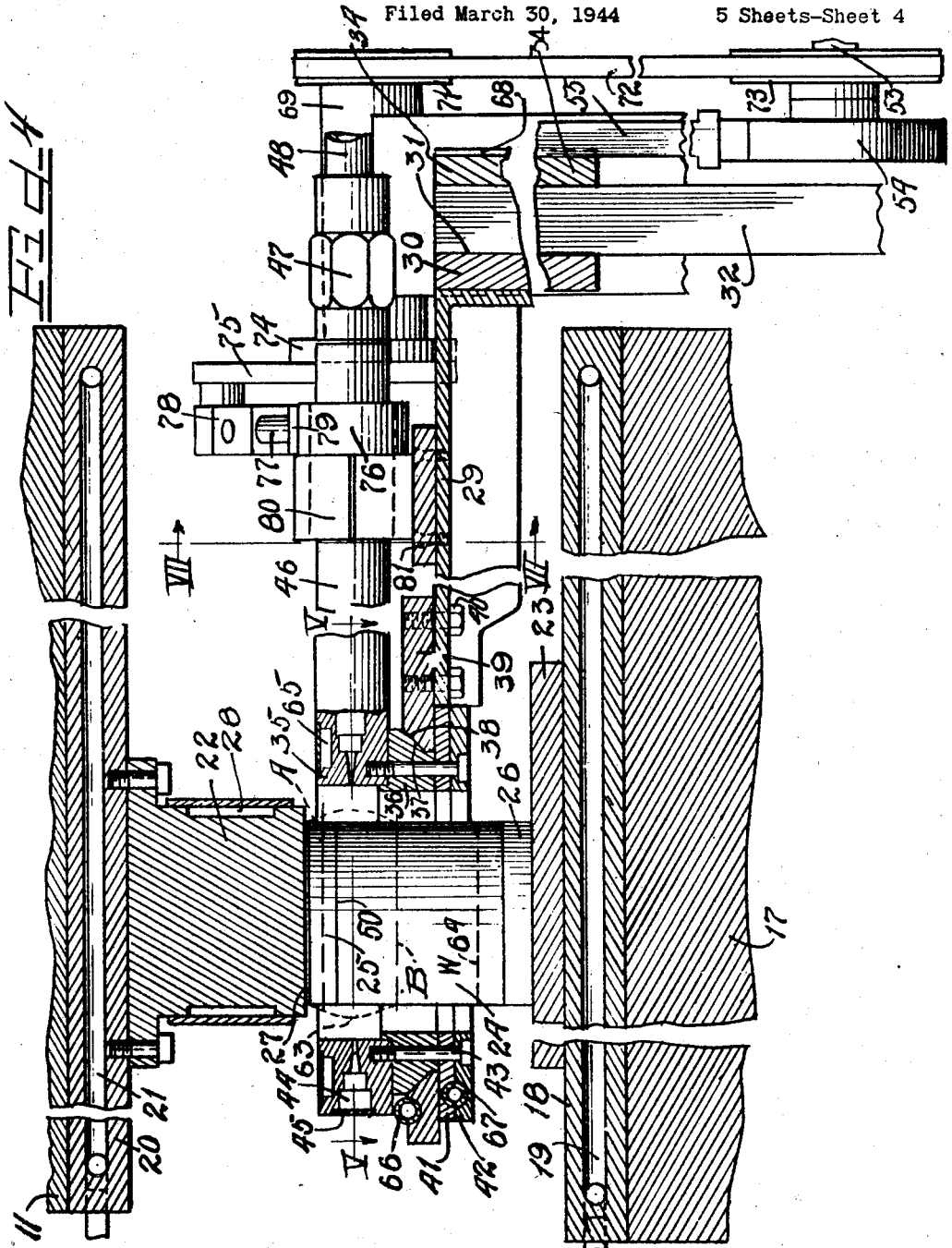

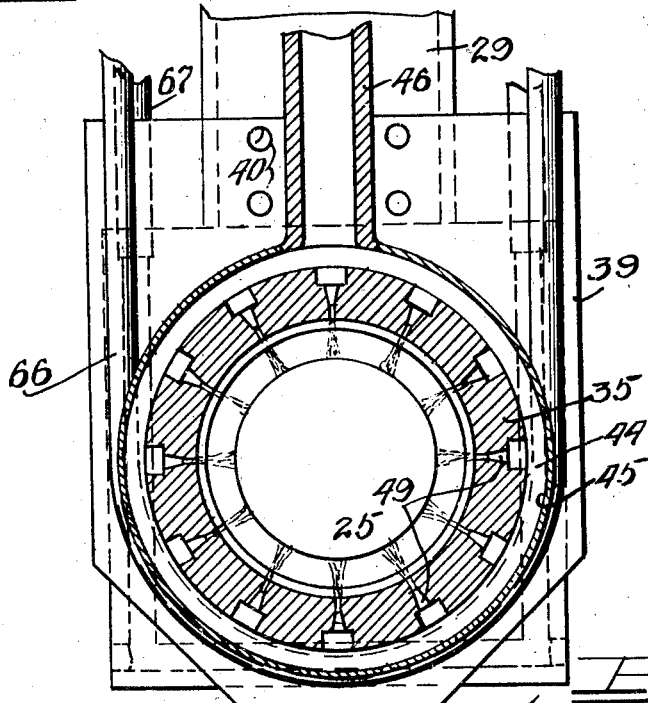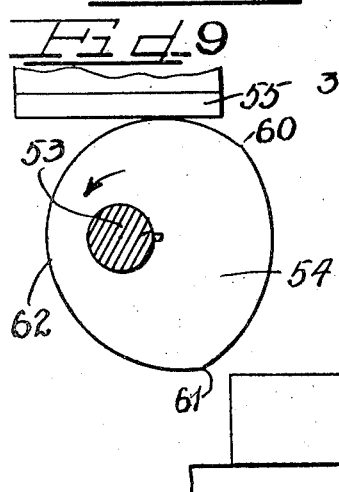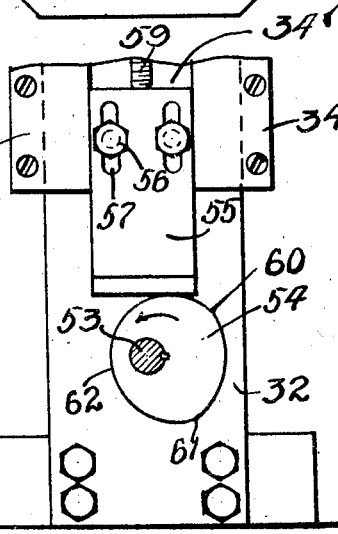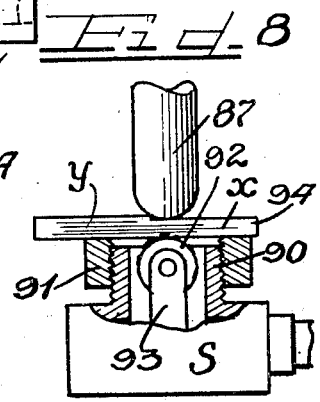

Patented Feb. 10, 1948

2,435,702

UNITED STATES PATENT OFFICE 2,435,702

PRESSURE WELDING MACHINE

Phillip W. Vallée, Lakewood, Ohio, assignor to Thompson Products, Inc., Cleveland, Ohio, a corporation of Ohio Application March 30, 1944, Serial No. 528,804

4 Claims. (Cl. 78—82)

This invention relates to pressure welding machines adapted particularly for intimately welding together layers or zones of metal to produce solid composite metal billet blanks which are to be extruded and otherwise processed to form operating structures, as for example, poppet valves for aircraft or other internal combustion engines.

In order to withstand the tremendous heat to which poppet valves are subjected in operation as exhaust valves in internal combustion engines, such as airplane engines, the seat engaging heads of the valves are being protected by a layer or covering of corrosion and heat resistant metal or alloy. It is, therefore, an important object of my invention to provide a pressure welding machine for intimately welding together and upsetting along the welding line a cylindrical slug or billet of base metal and a disk of heat resistant non-corrosive metal or alloy to produce a solid composite metal billet blank which, by subsequent extrusion and forging operations is formed into a valve for which the disk metal provides a protecting layer or cap on the seat engaging valve head.

A further object of the invention is to provide in a press an annular heating element, preferably in the form of a torch ring, for surrounding the work in the press to impinge flame thereagainst for heating the work to a welding temperature at and adjacent to the welding line while pressure is being applied to the work for upsetting thereof around the welding line to the desired extent as welding temperature is reached.

A further object of the invention is to provide for combined axial reciprocation and rotary oscillation on its axis of the annular heating element, and with the reciprocation and oscillation out of phase, so that localization of impingement of jet flames against the work will be prevented and the work will be uniformly heated to welding temperature for accurate upsetting of the metal by the press pressure.

A further object is to provide for automatic reversal of the press as soon as the welding has been completed and the upsetting has progressed to the predetermined amount.

Still a further object is to provide electrical switch means on the press operable by the press movement at the end of the welding and upsetting operation, to control circuits for the operation of electrically controlled means to effect reversal of the press at the end of the welding operation so that the finished work may be removed.

Other and further objects of the invention will be apparent to those skilled in the art from the following detailed description of the annexed sheets of drawings, which, by way of preferred example, illustrate preferred embodiments on the invention.

On the drawings,

Figure 4 is an enlarged section on plane IV—IV, Figure 3;

Figure 5 is a section on plane V—V, Figure 4;

Figure 6 is a section on plane VI—VI, Figure 1;

Figure 8 is an enlarged side elevation of circuit controlling switch means and gauge means; and Figure 9 is an enlarged view of the cam shown on Figure 6.

Figure 1:
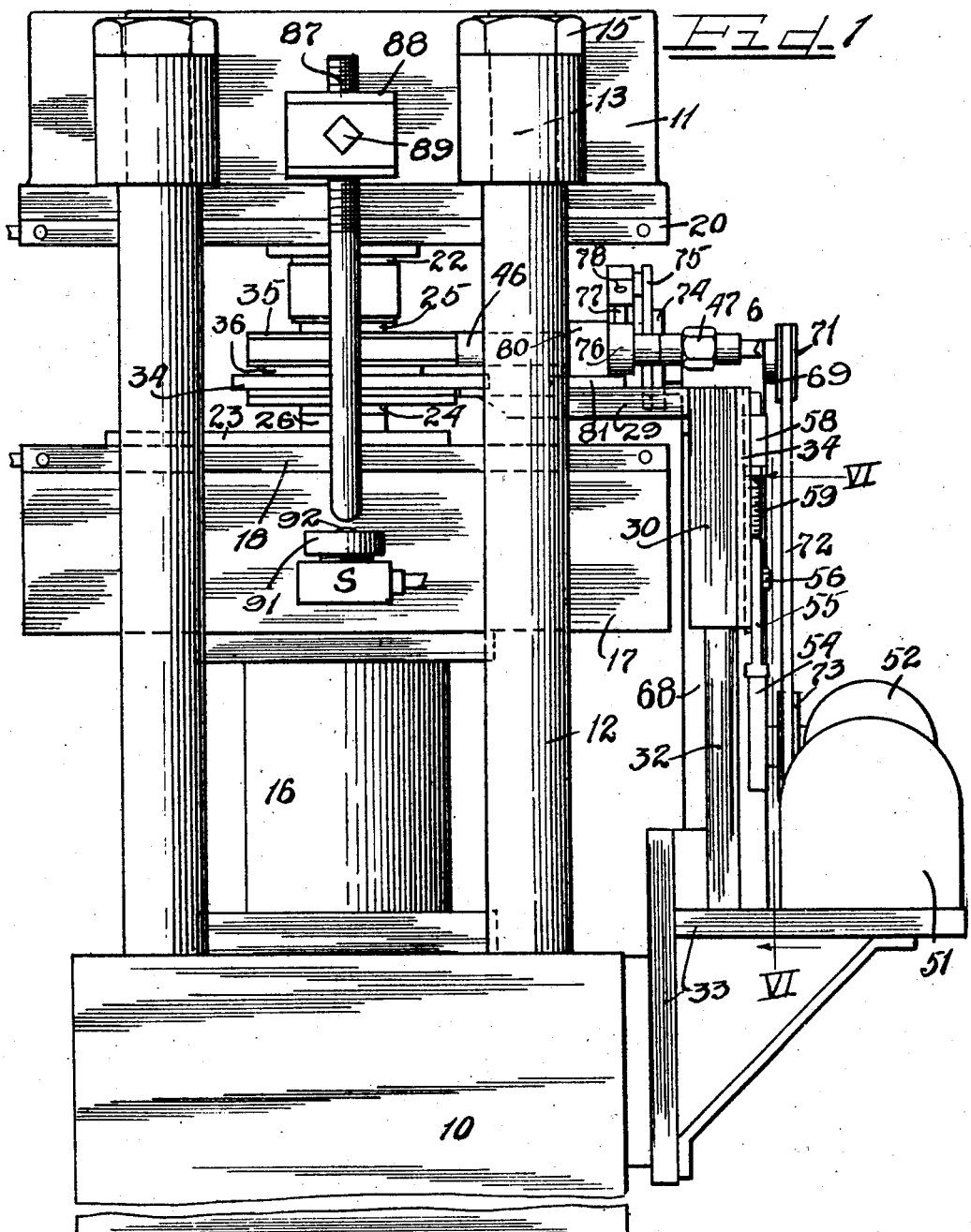
Figure 1 is a side elevation of the machine.
Figure 2:
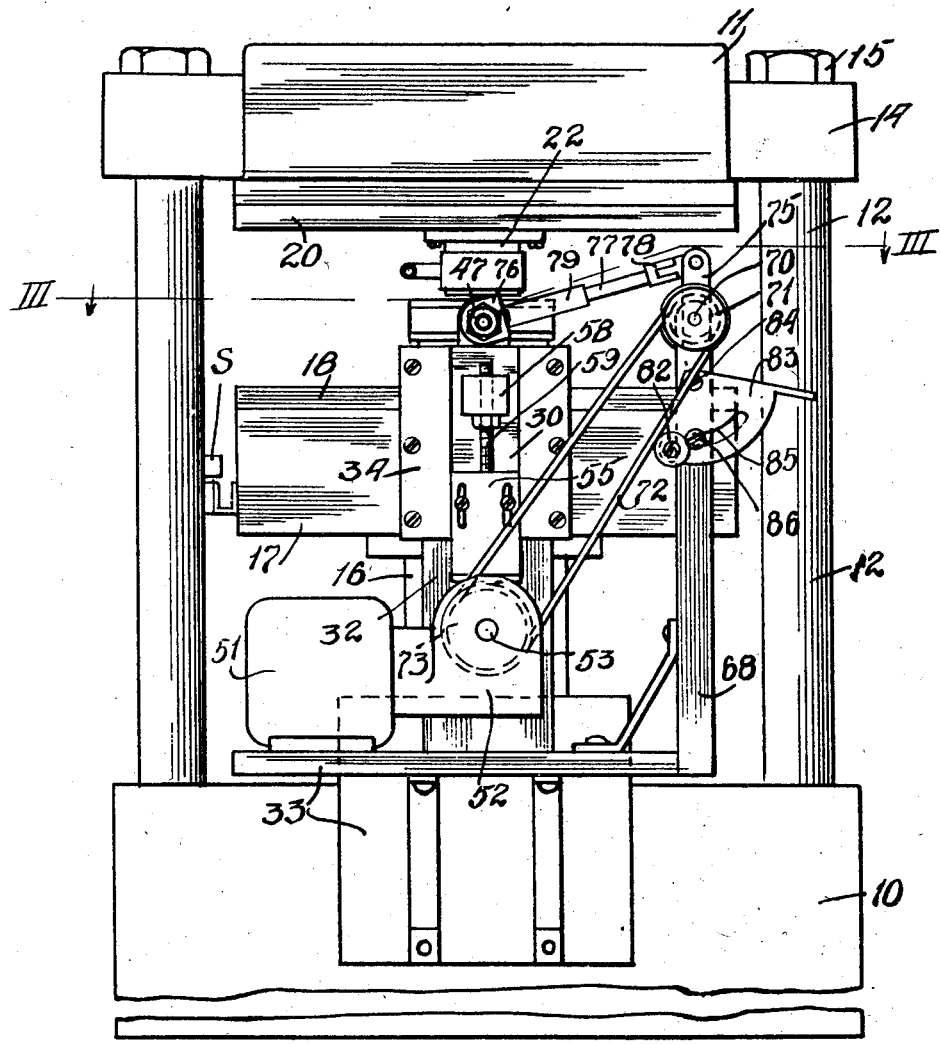
Figure 2 is a rear elevation thereof at reduced scale.
Figure 3:
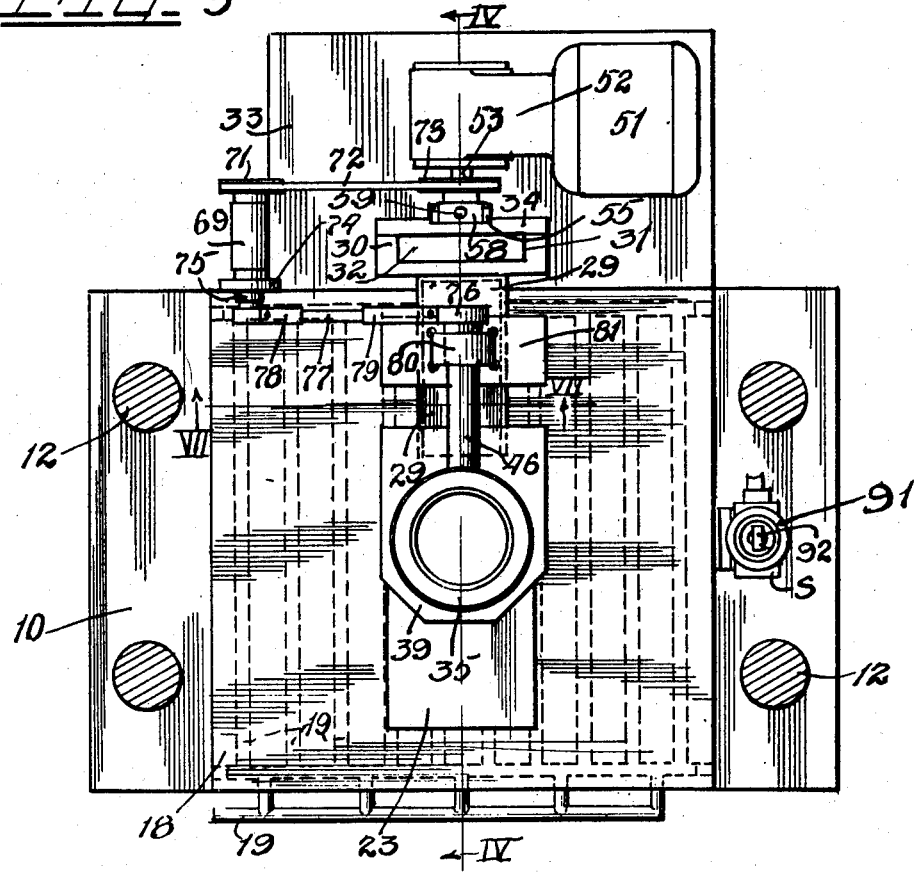
Figure 3 is a section on plane III—III, Figure 2.
Figure 7:
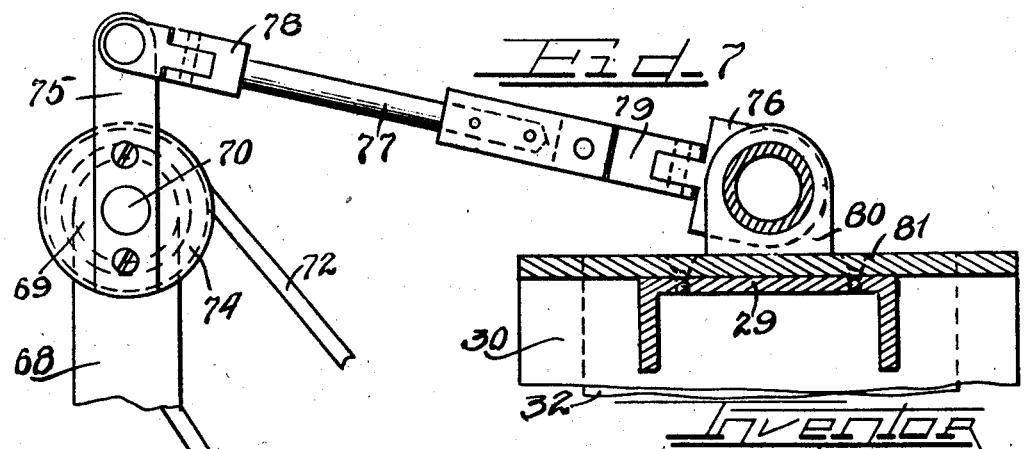
Figure 7 is a section on plane VII—VII, Figures 3 and 4.

The machine shown comprises a hydraulic press structure having the base frame 10 and a top frame 11, tension bars 12 being secured to and extending upwardly from the base frame with their threaded necks 13 extending through lugs 14 on the top frame 11 to receive nuts 15 whereby the top frame is rigidly secured to the upper ends of the tension bars. A ram piston 16 is in hydraulic cooperation with means (not shown) within the base 10 to be hydraulically raised, and terminates in a head 17. This head is faced by a plate 18 having passageways 19 therethrough for flow of cooling medium, such as water. The top frame 11 is faced by a plate 20 having passageways 21 therethrough for cooling medium such as water. Secured to and depending from the upper frame structure 11 is the cylindrical press-block or anvil 22, and mounted on the ram head is the press-plate 23, the top surface of this plate and the lower end surface of the anvil 22 being accurately finished so that they will be in parallel during operation of the press.

The work W to be welded is disposed between the anvil 22 and the press-plate 23. The work W shown in the machine is a composite metal assembly comprising the cylindrical body part or billet 24 and the cylindrical disk 25 which are to be intimately welded together to produce a composite metal billet blank. Where this billet blank is to be transformed, as by an extrusion, forging or other operation, to produce an article such for example as an exhaust valve for internal combustion engines, the body 24 will be of some forgeable base metal, while the part 25 will be of corrosion resistant metal, which, when the valve has been formed, will provide a heat and corrosion resistant facing for the valve head and seat. Before the billet assembly is placed in the machine, the end surfaces of the parts 24 and 25 are accurately finished to be smooth and clean so that the engaging faces will have full and intimate contact with each other. The billet assembly may be mounted on a spacer disk 26 on the pressplate 23, the opposite faces of which are also accurately finished for full intimate contact with the top of the plate 23 and the lower end of the billet assembly member 24. When the ram is raised, the billet assembly will be brought into pressure engagement with the anvil 22, and during the application of pressure the assembly is heated for intimate welding together of the billet assembly parts. To protect the anvil 22 from the welding heat, a heat resistant sheet 27, preferably of mica, is interposed between the anvil and the disk 25 of the billet assembly, and the anvil 22 may further be provided with a water jacket 28.

While the work is being put under pressure, it is subjected to welding heat. The heating structure is mounted on a shelf 29 secured to and extending horizontally from a rectangular supporting head 30. This head has the rectangular passageway 31 for receiving a guide bar 32 which is secured to and extends upwardly from a bracket 33 secured to the side of the base structure 10, the head 30 with the shelf 29 thereon being movable vertically on the bar 32. The head is held to the bar by a cover 34 secured to the head.

The heater structure comprises the annular torch head 35 mounted to be concentric with the work assembly W. Secured against the underside of the torch head is the bearing ring 36 which has a beveled seating surface 37 engaging the beveled annular seat 38 provided by a plate 39 which is secured to the shelf 29, as by screws 40, to form a continuation thereof. A washer 41 engages the lower side of the seating ring 36 and the plate 39, the annular clamping plate 42 being engaged by screws 43 which extend upwardly through the washer 41 and through the seat ring 36 to thread into the torch ring 35. The torch ring is thus mounted for rotational movement on the shelf supported plate 39.

Referring to Figures 4 and 5, the torch head 35 has the circumferentially extending channel 44 whose outer side is closed by the annular band 45, the inlet pipe 46 for the combustion mixture extending laterally from the torch head over the shelf 29 for connection at its outer end by a coupling 47 with a supply pipe 48 for the combustible mixture such as, oxygen and acetylene. The combustion gases are directed from the channel 44 through jets 49 which are ignited for impingement of the flame on the work W. These jets are spaced circumferentially in the torch head in a diametral plane, this jet plane paralleling the plane of the engaging faces of the work parts 24 and 25 which are to be welded together.

As has already been explained, the shelf supporting head 30 is vertically movable on the guide bar 32. Means are provided for reciprocating this head with the shelf for application of the heating jets with the work at opposite sides of the contact plane 50 between the billet 24 and the disk 25, and provision is also made for oscillating the torch head through an arc during the reciprocal vertical movement of the head, and with the reciprocation and oscillation out of phase with each other so that the same spiral paths will not be traversed by the jets so as to avoid any possibility of localization of heating impingement and insure uniform heating of the work to welding temperature.

Describing first the reciprocating mechanism, an electric motor 51 is mounted on the bracket 33 and is connected through reduction gearing 52 with a shaft 53 on which a cam 54 is mounted, as best shown on Figures 1, 4 and 6. This cam engages a plate 55 mounted in a channel 34' in the cover 34 and adjustable vertically by screws 56 extending through slots 57. Above the plate, the cover 34 has a lug 58 thereon for a threaded abutment screw 59 for the plate. The plate 55 is first set for the desired vertical movement of the head 30 by the cam 54 and then the screw 59 is set to engage with the plate to maintain this adjustment. The cycle of reciprocation of the head 30 and the torch ring 35 is determined by the contour of the cam 54.

Referring to Figures 6 and 9, on the cam 54 shown, the cam surface between the high points 60 and 61 is in the arc of a circle centered at the axis of the cam shaft 53, this surface extending through approximately 90°. From the high points the cam surface gradually recedes to the low point 62. Referring to Figure 4, the jet plane is a distance below the welding line 50 and the corresponding position of the cam is shown on Figures 6 and 9. The cam is rotating in counterclockwise direction, its high point coming into engagement with the plate 55 for raising of the torch ring to bring the jet plane into the plane A a distance above the welding line 50, and then, between the points 60 and 61 the torch ring is maintained at plane A. Thereafter, during cam engagement from the point 61 through the low spot 62 back to the point 60, the jet plane will be gradually lowered to the plane B and then gradually raised past the welding line to plane A. With this cycle of operation, the metal of disk 25, which requires more heat than the metal of the billet 24 to bring it to welding temperature, will be heated so that both metals will reach welding temperature at the same time. Any variation of heat distribution may be accomplished by a proper variation of the cam contour.

It is to be understood, of course, that during heating of the work, pressure is being exerted thereagainst by the hydraulic ram, and initially, while the work is being brought toward welding temperature, the pressure may be comparatively low, but as the welding temperature is reached, the pressure is increased, the disk 25 then being intimately welded to the part 24 and, as this part 24 is moved upwardly under the high pressure of the hydraulic press, the metal adjacent to the welding plane will be upset to form the annular bulge or bead of upset metal 63 around the work across the weld line, the disk 25 decreasing in thickness and the part 24 decreasing more, the dotted line 64 (Figure 4) indicating the lower face of the work after the welding operation.

To prevent overheating of the torch ring 35, it may be provided with a water jacket 65 at its upper side. A loop 66 for cooling medium may be mounted on the plate 39 below the torch head and another cooling loop 67 may be applied between the spacer 41 and the clamping plate 42.

Describing now the mechanism for oscillating the torch head, a post 68 is secured to and extends upwardly from the bracket 33 and terminates at its upper end in a bearing head 69 for a shaft 70. On the outer end of the shaft is a pulley 71 connected by a belt 72 with the driving pulley 73 on the motor reduction gearing shaft 53. At its inner end the shaft 70 carries a crank disk 74 from which extends the crank arm 75. A connecting rod structure connects this crank arm with the inlet pipe 46 of the torch ring. A collar 76 engages the pipe, the connecting rod 77 being connected with the crank arm and the collar by universal coupling structures 78 and 79, respectively. Thus, upon rotation of the pulley 71, the torch head will be oscillated on the bearing seat 38 on the plate 39 which extends from the shelf 29. In order to further support the torch head and hold it concentric with the bearing seat during oscillation thereof, a shoe collar 80 receives the pipe 46 and engages a track-plate 81 on the shelf 29. By having the pulleys 71 and 73 of different diameters, the oscillation of the torch head will be out of phase with the reciprocation thereof. On the drawings, the pulley 71 is shown smaller than the pulley 73, but it could be larger than the pulley 73. By this out-of-phase operation of the oscillation and reciprocation of the torch head, localization of heat impingement on the work by the jets will be avoided and the heating to welding temperature will be uniformly accomplished. The jets will heat the work inwardly from the outer periphery thereof, so that the contacting surfaces between the work parts 24 and 25 will be heated by conduction to welding temperature.

To keep the belt 72 properly tensed, an idler pulley 82 may be provided therefor on a segment plate 83 pivoted at 84 to the post 68 and having a slot 85 for a set screw 86, whereby the pulley may be set for proper tensioning of the belt.

Means are provided for controlling the automatic reversing of the press action whenever the work acted upon has been compressed to the desired height. As shown on Figure 1, a switch S is mounted on the ram head 17 for actuation by a rod 87 extending down from the upper press head 11. The switch is preferably a micro-switch and is shown to enlarged scale on Figure 8. The rod 87 has threaded engagement in a lug 88 on the press head 11 so that it may be axially adjusted and locked in set position by a screw 89. The switch may control the circuit for a solenoid operated valve which controls the direction of flow into or out of the ram cylinder located in the base 10. When the work W has been set into the press and held between the ram head 17 and the anvil 22, the rod 87 is set for a gap between its lower end and the switch in accordance with the predetermined length of shortening of the work during the welding operation for the desired amount of upsetting. As soon as this limited movement is reached, the rod 87 should engage with and open the switch for releasing the pressure under the ram for return thereof to its starting position. Compensation must be made for the distance the switch button moves before opening the switch after engagement of the rod with the switch button. Figure 8 shows how such compensation may be effected. The switch body has a thread neck 90 for receiving a thread collar 91, the threading being preferably tight so that after setting of the collar it will lock itself frictionally against displacement. The switch button is shown in the form of a roller 92 at the upper end of a bar 93 which at its lower end cooperates with a switching spring which tends to hold the button out when the circuit is to be closed and which, upon depression of the button and the bar 93 opens the circuit, the travel of the button from closed to open position of a micro switch being comparatively small. On Figure 8, the full lines show the button in its inner or circuit opening position, and the dotted line shows it in its outer or circuit closing position. The collar 91 is set so that when a plate, such as a gauge plate 94, is pressed down against the outer end of the collar 91 against the projecting button 92 the button will be moved in just far enough for setting of the switch to open position. The gauge plate 94 has the two gauging portions X and Y, and the thickness of the portion X will correspond with the predetermined extent of shortening of the work during the pressure and welding operation. Now, after the work has been aligned in the press preparatory to the welding operation, as shown on Figure 1, the gauge plate end X is inserted between the switch collar 91 and the end of the rod 87, and if the gap is such that the part Y of the gauge plate may be passed through, then the rod 87 must be set downwardly until only the end X will pass through the gap. Now, when the gauge plate is removed, the switch button will move to its outer position, and then as the press continues to close during the welding operation and the work is being decreased in height, the end of the rod will come into engagement with the switch button for movement thereof for setting of the switch at the proper time for release of the pressure under the ram, the ram structure being then moved downwardly so that the finished work may be removed from the press.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a power press, press platens having coolant-jacketed faces, a coolant-jacketed anvil projecting from one of said faces, a torch ring adapted to receive said anvil mounted in the space between said faces, means for raising and lowering said torch ring, and means for contemporaneously swinging said torch ring.

2. In combination with a power press having a stationary top head and a movable bottom press platen, a water-jacketed anvil depending from said top head, a vertical track mounted alongside of said movable platen, a carriage slidable on said track, a horizontal arm carried by said carriage projecting between said head and said platen, a torch ring rotatably mounted on said arm, said arm and said torch ring having aligned apertures therethrough freely accommodating said water-jacketed anvil, an electric motor, a cam driven by said electric motor, an adjustable cam follower on said carriage for determining the level of said arm and for cooperating with the cam to reciprocate the arm, and a device for oscillating said torch ring on said arm drivingly connected to said motor whereby said motor contemporaneously oscillates and reciprocates the torch ring.

3. In a power press having cooperating work pressing platens, relatively movable vertically, the improvements of a horizontal arm extending between said platens, a torch ring carried by said arm, a vertical track for said arm positioned outside of the space between said platens, means for raising and lowering said arm on said track to reciprocate the arm and torch ring between the platens, said means including means for varying the vertical position of the zone of reciprocation of the arm and torch ring with respect to one platen while maintaining the stroke constant so that the jet discharge from the ring may be directed against the pieces to be welded each side of the joint therebetween for such relative time intervals as will raise the temperature regardless of the differences in constituents and sizes of said pieces, said means including a vertically disposed screw in threaded engagement with said arm for endwise adjustment with respect to said arm, a slide adjustably connected to said screw, and a rotatable cam acting against said slide to move said slide screw and arm vertically.

4. In combination with a power press having opposed platens relatively movable in vertical direction, an arm extending horizontally between said platens, adjustable means for controlling the level and movement of said arm comprising two members connected together for vertical movement and for relative vertical adjustment, one of said members being adjustably connected to said arm, a cam engaging the other of said members to reciprocate said connected members and arm, a torch ring rotatably mounted on said arm, and means for oscillating the torch ring as said arm is reciprocated by said cam.

PHILLIP W. VALLÉE.

REFERENCES CITED

The following references are of record in the file of this patent:

UNITED STATES PATENTS

| Number | Name | Date |
|---|---|---|
| 470,623 | Levez | Mar. 8, 1892 |
| 473,884 | Lipe et al. | Apr. 26, 1892 |
| 610,524 | Cleveland | Sept. 13, 1898 |
| 1,848,905 | Rabezzana | Mar. 8, 1932 |
| 1,872,235 | Boyd | Aug. 16, 1932 |
| 2,018,379 | Pfeiffer | Oct. 22, 1935 |
| 2,054,375 | Halle | Sept. 15, 1936 |
| 2,061,287 | Muehl | Nov. 17, 1936 |
| 2,231,014 | Lytle et al. | Feb. 11, 1941 |
| 2,231,027 | Renner, Jr. | Feb. 11, 1941 |
| 2,269,523 | Deutsch | Jan. 13, 1942 |
| 2,376,765 | Forbes, Jr. | May 22, 1945 |

FOREIGN PATENTS

| Number | Country | Date |
|---|---|---|
| 547,112 | Great Britain | Aug. 13, 1942 |